(12) United States Patent
Bytzek

(10) Patent No.: US 9,375,993 B2
(45) Date of Patent: Jun. 28, 2016

(54) ELECTRICAL HEATING UNIT, HEATING DEVICE FOR A VEHICLE AND METHOD FOR PRODUCING A HEATING UNIT

(75) Inventor: Dietmar Bytzek, Germersheim (DE)

(73) Assignee: WEBASTO SE, Stockdorf (DE)

( * ) Notice: Subject to any disclaimer, the term of this patent is extended or adjusted under 35 U.S.C. 154(b) by 162 days.

(21) Appl. No.: 14/239,886

(22) PCT Filed: Aug. 21, 2012

(86) PCT No.: PCT/EP2012/066281
§ 371 (c)(1),
(2), (4) Date: Mar. 26, 2014

(87) PCT Pub. No.: WO2013/030048
PCT Pub. Date: Mar. 7, 2013

(65) Prior Publication Data
US 2014/0217086 A1    Aug. 7, 2014

(30) Foreign Application Priority Data
Aug. 30, 2011   (DE) .......................... 10 2011 081 831

(51) Int. Cl.
*H05B 1/02* (2006.01)
*B60H 1/00* (2006.01)
(Continued)

(52) U.S. Cl.
CPC .. *B60H 1/00* (2013.01); *H05B 3/00* (2013.01); *H05B 3/26* (2013.01); *H05B 2203/003* (2013.01); *H05B 2203/013* (2013.01); *H05B 2203/023* (2013.01); *Y10T 29/49083* (2015.01)

(58) Field of Classification Search
CPC ...... B60H 1/00; Y10T 29/49083; H05B 3/26; H05B 2203/003; H05B 2203/013; H05B 2203/023; H05B 3/00

USPC .......... 219/480, 495, 497, 504, 505, 538, 540
See application file for complete search history.

(56) References Cited

U.S. PATENT DOCUMENTS

| 7,282,678 B2 | 10/2007 | Tung et al. |
| 2004/0178189 A1 | 9/2004 | Peyronny |

(Continued)

FOREIGN PATENT DOCUMENTS

| CN | 1889792 A | 1/2007 |
| CN | 101115948 A | 1/2008 |

(Continued)

OTHER PUBLICATIONS

International Search Report for PCT/EP2012/066281, dated Nov. 30, 2012 (w/English language translation).

(Continued)

*Primary Examiner* — Mark Paschall
(74) *Attorney, Agent, or Firm* — Fitch, Even, Tabin & Flannery, LLP

(57) ABSTRACT

An electrical heating unit for a heating device for a vehicle is provided comprising a heating layer and a heat conducting body. The heating layer may comprise at least one heating resistor, and the heat conducting body may comprise a heat absorbing face for absorbing heat from the heating layer and a heat releasing face for releasing heat to a heat carrier fluid. The heat conducting body may comprise a base body and at least two heat releasing bodies, wherein the base body and the heat releasing body may be connected to each other by substance bonding or integrally formed, wherein the heat absorbing face is a surface of the base body facing the heating layer and extending parallel to the heating layer, and the heat releasing face is a surface of the heat releasing bodies. A heating device and method for producing a heating unit is provided.

22 Claims, 5 Drawing Sheets

(51) Int. Cl.
*H05B 3/26* (2006.01)
*H05B 3/00* (2006.01)

(56) References Cited

U.S. PATENT DOCUMENTS

| | | |
|---|---|---|
| 2007/0000898 A1 | 1/2007 | Tung et al. |
| 2007/0133964 A1 | 6/2007 | Natsuhara et al. |
| 2009/0272728 A1* | 11/2009 | Abbott .................. F14C 7/04 219/399 |
| 2014/0027434 A1* | 1/2014 | Reul .................. H05B 3/84 219/203 |
| 2014/0217086 A1* | 8/2014 | Bytzek .................. H05B 3/26 219/478 |

FOREIGN PATENT DOCUMENTS

| | | |
|---|---|---|
| DE | 1141737 B | 12/1962 |
| DE | 10032099 C1 | 4/2002 |
| FR | 2642929 A1 | 8/1990 |
| KR | 10 2004 0013558 A | 2/2004 |
| KR | 10 2004 0034273 A | 4/2004 |
| WO | 03/017725 A1 | 2/2003 |
| WO | 2011085915 A1 | 7/2011 |

OTHER PUBLICATIONS

International Preliminary Report on Patentability issued against International Application PCT/EP2012/066281.

* cited by examiner

ELECTRICAL HEATING UNIT, HEATING DEVICE FOR A VEHICLE AND METHOD FOR PRODUCING A HEATING UNIT

CROSS REFERENCE TO RELATED APPLICATIONS

This application is a U.S. national phase application of International Application No. PCT/EP2012/066281, filed Aug. 21, 2012, which claims benefit of the priority date of German Application 10 2011 081 831.6, filed Aug. 30, 2011, which are hereby incorporated herein by reference in their entirety.

The invention relates to an electrical heating unit for a heating device for a vehicle comprising a heating layer and a heat conducting body, wherein the heating layer comprises at least one heating resistor, and the heat conducting body comprises a heat absorbing face for absorbing heat from the heating layer and a heat releasing face for releasing heat to a heat carrier fluid. The invention further relates to a heating device for a vehicle as well as to a method for producing a heating unit.

Such heating devices are often used as auxiliary heating, for example in motor vehicles. They render the generation of heat possible without depending on a combustion engine for this purpose. The heat may, for example, be used for heating air in the interior space. Electrical heating devices are therefore, in particular, also usable in vehicles without a combustion engine, for example in electric vehicles, railway carriages, sailing boats, airplanes as well as in mobile office or living containers.

As the heat conducting body, for example, a corrugated or accordion pleat-like folded heat conducting structure may be used. Such a structure has positions of extremum which may directly or indirectly contact the heating layer to receive heat from the heating layer and to transfer it via the remaining structures. Such a device is known from the German patent specification DE 100 32 099 C1.

It is the object of the present invention to provide an electrical heating unit which is capable of conveying the heat generated in the heating layer to the heat carrier fluid as rapidly as possible, is mechanically robust, and simple to produce. It is further the object of the invention to provide a heating device comprising such a heating unit. It is further the object of the invention to provide a method for producing such a heating unit. These objects are solved by the features of the independent claims. Advantageous embodiments arise from the dependent claims.

The electrical heating unit is based on the generic state of the art in that the heat conducting body comprises a base body and at least two heat releasing bodies, wherein the base body and the heat releasing body are connected to each other by substance bonding or integrally formed, wherein the heat absorbing face is a surface of the base body facing the heating layer and extending parallel to the heating layer, and the heat releasing face is a surface of the heat releasing body. The heat absorbing face extending parallel to the heating layer may be considerably larger as compared to the entire surface of positions of extremums of a known corrugated heat dissipation structure. The integrally formed or substance bonded design of the base body and the heat releasing bodies, furthermore, results in a good heat flow and a high robustness. The base body may, for example, serve as a substrate for the heating layer. An additional supporting element between the heat conducting body and the heating layer can be omitted. The heat releasing face may be a continuous surface of the at least two heat releasing bodies or consist of separate surfaces. For example, the heat releasing bodies may have surfaces which do not contact each other but form the abovementioned heat releasing face together. The heat carrier fluid may, for example, be air or a liquid. The heating device may be designed so that, in operation, the heat carrier fluid flows along the heat releasing face of the heat conducting body. The heating device may, for example, comprise a fan or a pump for generating the flow of the heat carrier fluid. The fluid may, for example, be water. It is possible that the heat carrier fluid is used as a heat transport medium in a heat exchanger. This means that the heating device comprises a heat exchanger or is connected to a heat exchanger through which the heat carrier fluid flows. The heat exchanger then transmits at least part of the heat of the heat carrier fluid to the medium to be actually heated or the body to be actually heated.

The base body and the heating layer may be connected to each other by substance bonding. In this way, a particularly good thermal contact between the base body and the heating layer can be realised. In particular, it may be contemplated that the base body is connected to the heating layer by substance bonding over its entire heat absorbing face. The base body and the heating layer may be directly or indirectly connected to each other by substance bonding. For example, it is possible that the heating layer is directly applied to the heat absorbing face of the base body. Directly, in this connection, means that no other layer exists between the base body and the heating layer. However, it is also possible that one or more intermediate layers are disposed between the base body and the heating layer which are respectively connected to the base body, the heating layer and (in case of a plurality intermediate layers) to each other by substance bonding. A substance-to-substance bond is to be understood to be a connection in which the connection partners, in this case the base body, the heating layer, and possibly the intermediate layers, are kept together by atomic or molecular forces.

An electrically insulating insulation layer may be provided between the heating layer and the base body. The insulation layer may be particularly advantageous if the heat conducting body is formed of an electrically conductive material, for example a metal. The insulation layer renders a particularly simple design of the heating layer possible by preventing various points of the heating resistor from being electrically connected to each other via the heat conducting body. The heating resistor may, for example, be printed onto or otherwise be fixed on the insulation layer.

The insulation layer may, for example, contain a ceramic material or a polymer material. The material may be selected so the heat conducting body and the insulation layer have matched (for example identical) heat expansion coefficients. In this way, thermal stress in the electrical heating unit can be minimised.

The heating unit may comprise at least one plug-in device which is provided to engage with a complementary plug-in device of a second heating unit identical in construction. The plug-in devices render it possible to mechanically connect an arbitrary number of heating units to each other in a simple manner, for example in a stack or in a chain. The plug-in connections may, in particular, be designed so that the heating units arranged in a chain or in a stack are aligned.

The heating layer may be free from another heat conducting body on its side facing away from the heat absorbing face, and no flow area for a heat carrier fluid needs to be provided on the side of the heating layer facing away from the heat absorbing face either. For example, a thermal insulation material and/or a material well reflecting heat may be provided on the side of the heating layer facing away from the von the heat absorbing face. Such embodiments in which the heating layer is only provided with a heat conducting body on a primary side have an asymmetric design with regard to the heating layer. The heat absorbing face and a surface of the heating layer facing the base body may be congruent in such but also in other cases. Congruent means superposable. Here, a large heat transfer surface between the base body and the heating layer may be realised with a materials input which is as low as possible. The heat absorbing face and the surface of the heating layer facing the base body may, for example, define congruent rectangles.

The heat releasing face may be larger than the heat absorbing face. This may be particularly advantageous if a heat conduction coefficient for the heat flow through the heat releasing face is lower than a corresponding heat conduction coefficient for the heat flow through the heat absorbing face. A sufficiently large heat flow through the heat releasing face into the heat carrier fluid may realised in this way without dimensioning the heat absorbing face of the base body unnecessarily large for this purpose.

The heat releasing bodies may, for example, be formed as heat ribs. The heat ribs may, for example, be arranged on the base body parallel to each other in regular intervals. It may further be contemplated that each of the heat ribs of the heating unit merges into a heat rib of an adjacent heating unit. This means that respectively one heat rib of a first heating unit is integrally formed with an associated heat rib of an adjacent second heating unit. The heat conducting body of the first heating unit and the heat conducting body of the second heating unit are also integrally formed in this case.

The heat releasing bodies may extend in a plane perpendicular to the heat absorbing face. Each of the heat releasing bodies may, for example, be formed as a flat body extending from the heat absorbing face.

The heating device for a vehicle is based on the generic state of the art in that it comprises a heating unit of the type described here. The heating device may, in particular, be an auxiliary heating for a motor vehicle.

The heating device may comprise a stack of at least two heating units. In this connection a stack is to be understood to be an arrangement of at least two heating units in which the heating layers and possibly the insulation layers of the heating units are arranged parallel with respect to each other. In the stack, respectively, a heat conducting body of a first heating unit and a heat conducting body of an adjacent second heating unit may be connected to each other by substance bonding or integrally formed. The two adjacent heating units may thus share a common heat conducting body, the common heat conducting body consisting of the abovementioned heat conducting body of the first heating unit and the abovementioned heat conducting body of the second heating unit. In other words, this means that the heat conducting body of the first heating unit and the heat conducting body of the second heating unit form a common heat conducting body of the first and the second heating unit. The common heat conducting body thus connects the base body of the first heating unit to the base body of the second heating unit. From the base body of the first heating unit common heat releasing bodies may extend to the base body of the second heating unit. The stack may allow the heat carrier fluid to flow through, for example in a direction perpendicular to the stack direction.

The heating device may comprise a clamping device pressing the at least two heating units against each other. The heating device thus locks the heating units in place relative to each other and, apart from that, establishes a thermally conducting contact between them. The clamping device may, for example, comprise at least one strap running around the heating units or a vice encompassing the heating units.

The method for producing a heating unit, particularly the claimed heating unit, is based on the generic state of the art in that it includes the following: manufacturing the heat conducting body; applying the insulation layer to the heat absorbing face and applying the heating layer to the insulation layer. The heat conducting body is used as a substrate in the process so that an additional carrier material strip or another substrate for the heating layer can be omitted.

The heat conducting body may advantageously be produced of a metal or an alloy having a relatively low melting point or at least contain such a material. For example, aluminium and/or magnesium may be used.

For manufacturing the heat conducting body particularly casting, injection moulding or extrusion methods may be considered.

The insulation layer may, for example, be applied to the heat absorbing face using a plasma coating method. For example, the insulation layer may be sprayed onto the heat absorbing face as plasma.

The insulation layer may contain a ceramic material or a polymer material or consist of such a material, wherein, for example, $Al_2O_3$ qualifies for the ceramic material.

The heating layer may, for example, be applied to the insulation layer using a plasma coating method or a screen printing method or as a resistor paste. In the plasma coating method, for example, first an electrically conductive layer may be applied to the insulation layer. Then sections may be cut out of the electrically conductive layer so that a conductive path or a plurality of conductive paths remain in place. The conductive paths may then form the heating resistor or a plurality of heating resistors. The abovementioned sections may, for example, be cut out of the conductive layer with the aid of a laser. The conductive layer may, for example, be a metal layer. The heating layer may, for example, contain nickel and chrome or consist only of these materials. In this case, for example, 70 to 90% nickel and 10 to 30% chrome may be used, wherein a ratio of 80% nickel and 20% chrome is considered well-suited.

The invention will be explained in more detail with reference to the appended drawings. In the drawings, the same numerals designate identical or similar components.

Figure 1:
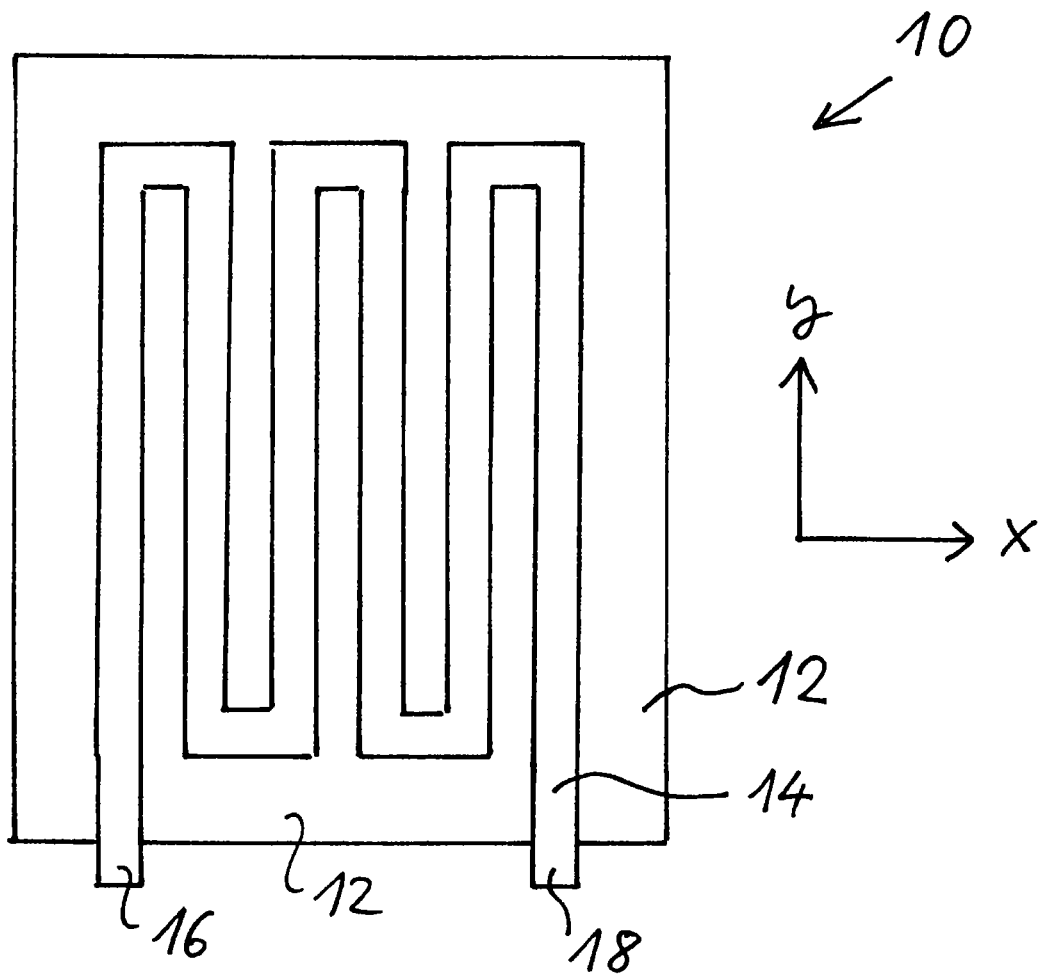
FIG. 1 shows a schematic top view of an embodiment of a heating layer.

FIG. 1 shows a heating layer 10 comprising two electrically insulating areas 12 and an electrically conducting conductive path 14. The conductive path 14 comprises a first end 16 and a second end 18 and forms a heating resistor. The first end 16 and the second end 18 serve as contacts through which an electric voltage can be applied to the conductive path. In the example shown the conductive path 14 is serpentine-shaped. On the one hand, this is advantageous in that a great conductor length is provided on a comparably small surface. On the other hand it renders the arrangement of the first end 16 and the second end 18 at the same edge of the, for example, rectangular heating layer 12 possible.

The plane defined by the heating layer was selected as the xy plane in this as well as in the other drawings. Here, the same xyz coordinate system is used in all drawings.

The conductive path 14 may be embedded in an electrically insulating material filling the areas 12 in this example. Alternatively it is possible that the conductive path 14 extends on a carrier surface, and the insulating area 12 is filled with an ambient medium, for example air.

Figure 2:
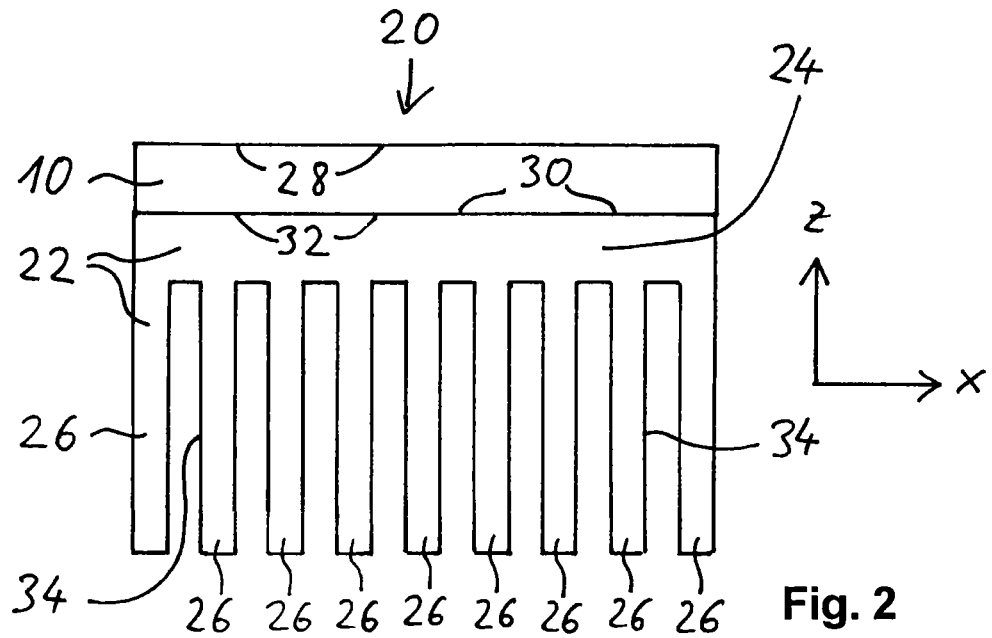
FIG. 2 shows a schematic cross sectional view of an embodiment an electrical heating unit.

FIG. 2 shows an electrical heating unit 20 for a heating device for a vehicle. The heating unit 20 comprises a heating layer 10 and a heat conducting body 22. The heating layer 10 comprises at least one heating resistor. The heating layer 10 may, for example, be the heating layer 10 described with reference to FIG. 1. The heat conducting body 22 comprises a heat absorbing face 32 for absorbing heat from the heating layer 10. The heat conducting body 22 further comprises a heat releasing face 34 for releasing heat to a heat carrier fluid. The heat carrier fluid may be a medium flowing past the heat releasing face 34, for example air or a liquid.

The heat conducting body 22 comprises a base body 24 and a plurality of heat releasing bodies 26. In the example shown the base body 24 is a flat cuboid extending parallel to the xy plane. Starting from the base body 24, a total number of nine heat releasing bodies 26 formed as heat ribs respectively extend in a plane parallel to the yz plane in this example. The base body 24 and the heat releasing bodies 26 are connected to each other by substance bonding or integrally formed. The heat conducting body 22 may, for example, be formed of a single piece of metal. The heat absorbing face 32 is a surface of the base body 24 facing the heating layer 10 and extending parallel to the heating layer 10, i.e., in this example, parallel to the xy plane. The heat releasing face 34 is a surface of the heat releasing bodies 26. In this example the heat releasing face 34 is comprised of the individual, not continuous surfaces of the heat releasing bodies 26.

In operation, an electric voltage is applied to the heating resistor of the heating layer 10. The heat developing in the process diffuses into the base body 24 of the heat conducting body 22 and from there into the individual heat releasing bodies 26. From the heat releasing bodies 26 the heat further diffuses into the heat carrier fluid, for example air or a liquid, which flows past the heat releasing bodies 26 or is at rest there.

Figure 3:
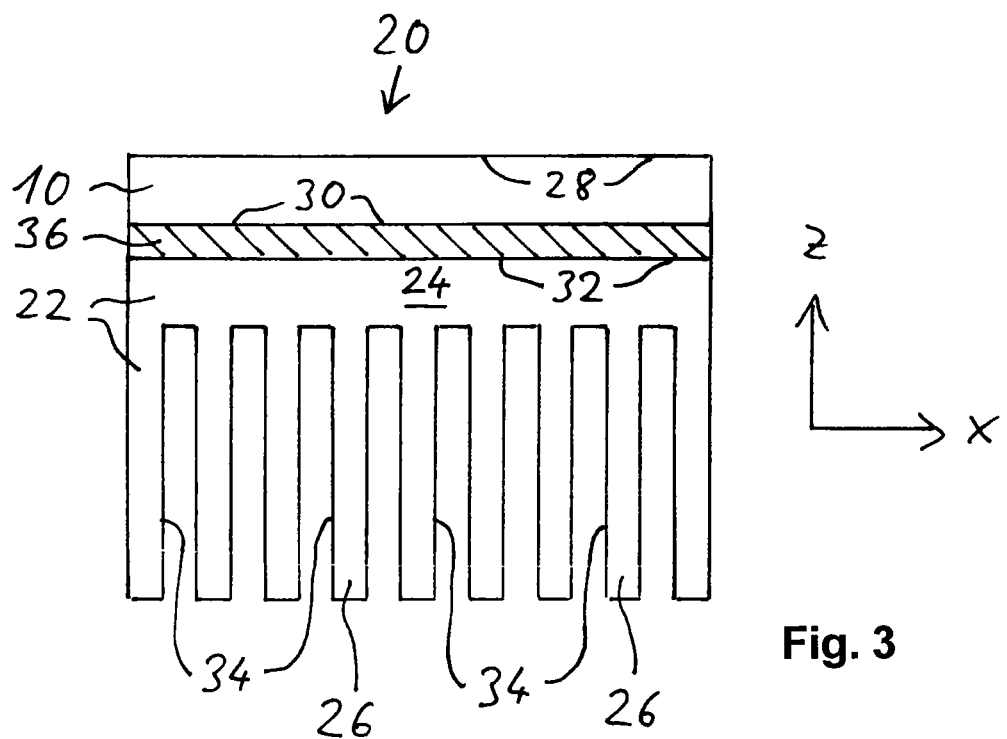
FIG. 3 shows a schematic cross sectional view of a further embodiment of an electrical heating unit.

FIG. 3 shows a variant of the heating unit 20 described with reference to FIG. 2. While the heating layer 10 rests directly on the heat absorbing face 32 of the base body 24 and is directly connected to the base body 24 by substance bonding in the heating unit 20 shown in FIG. 2, an electrically insulating insulation layer 36 is disposed between the heating layer 10 and the base body 24 in the heating unit shown in FIG. 3. The insulation layer 36 may, for example, contain a ceramic material or a polymer material.

In the two embodiments described with reference to FIG. 2 and FIG. 3 the heat absorbing face 32 and the surface of the heating layer 10 facing the base body 24 are congruent. In FIG. 2 and FIG. 3 they are rectangular, respectively, and extend parallel to the xy plane, respectively. Since in both cases a heat conducting body 22 is provided only on a primary side of the heating layer 10 asymmetric designs are concerned with regard to the heating layer 10. On the side of the heating layer 10 on which no heat conducting body is provided, for example, a thermal insulating material (not shown) or a material well reflecting heat (also not shown) may be provided.

The insulation layer 36 may have a thickness of less than one millimeter. The thickness of the insulation layer 36 is the dimension of the insulation layer 36 in the z direction in the drawings. It may, for example, be 300 micrometers.

Figure 4:
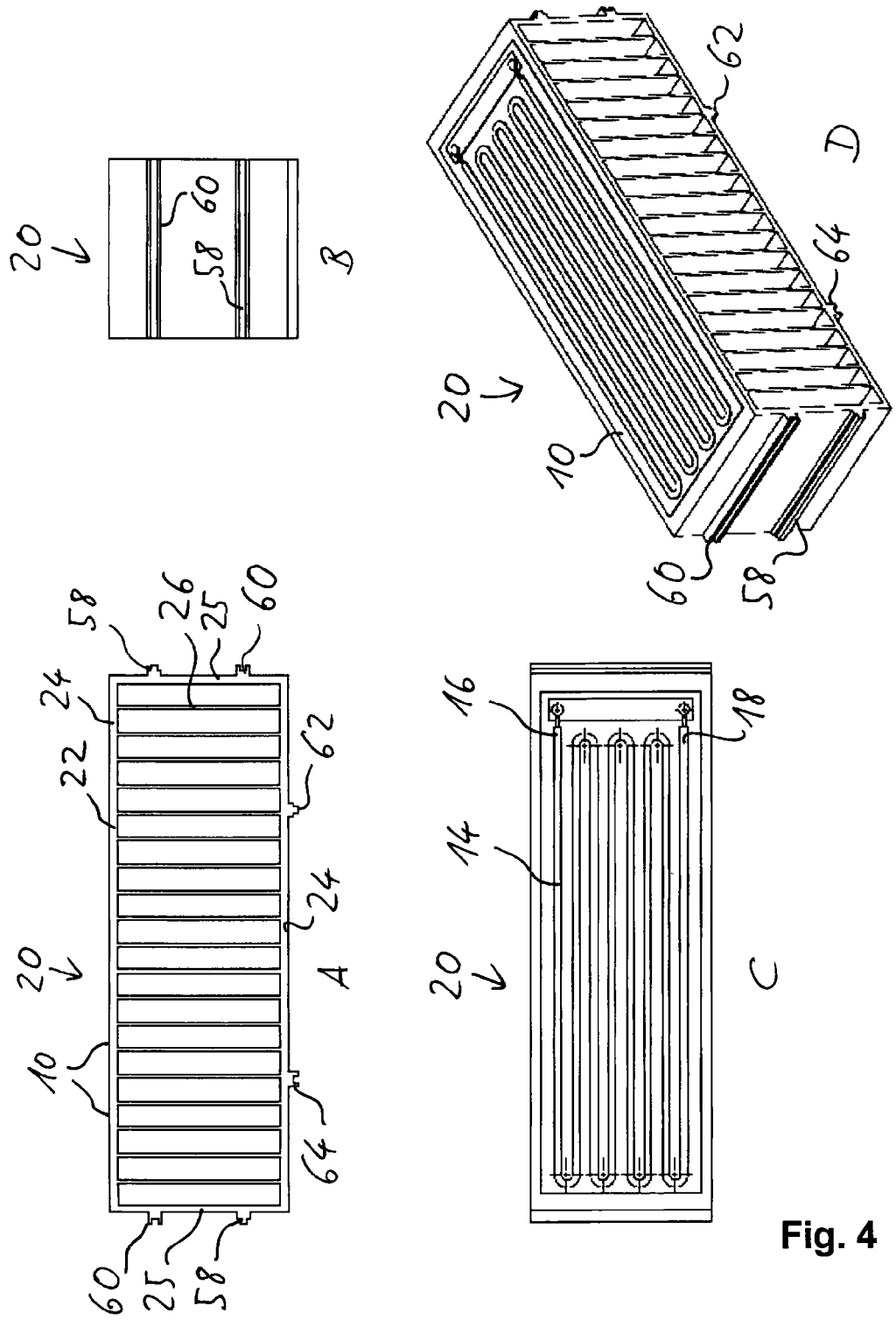
FIG. 4 shows schematic views of a further embodiment of an electrical heating unit.

FIG. 4 schematically shows a further embodiment of the heating unit 20 as viewed from four different angles of view A, B, C and D. The heat conducting body 22 has a cuboidal outer contour. The heat conducting body 20 comprises two main bodies 24. The two main bodies 24 are formed as rectangular boards between which the heat releasing bodies 26 extend. The two main bodies 24 are further connected to each other via two side walls 25. Each of the two side walls 25 comprises a first plug-in device 58 and a second plug-in device 60. The two plug-in devices 58 and 60 render it possible to interlock the shown heating unit 20 with a similar or identical other heating unit (not shown). The first plug-in device 58 and the second plug-in device 60 are complementary with regard to each other. This means that the first plug-in device 58 is capable of engaging with a plug-in device of the second heating unit (not shown here) which is identical to the second plug-in device 60. The first plug-in devices 58 and the second plug-in devices 60 render it possible to stack a plurality of identical heating units 20 in a stacking direction extending perpendicular to the side surfaces 25. The first plug-in devices 58 and the second plug-in devices 60 are formed as rails extending parallel with respect to each other in the example shown. The first plug-in device 58 comprises a central centre rail while the second plug-in device comprises a grove complementary to the centre rail.

The heating unit 20 further comprises a third plug-in device 62 and a fourth plug-in device 64 at least on one of its two main bodies 24. In the example shown the third plug-in device 62 and the fourth plug-in device 64 are of the same type as the first plug-in device 58 and the second plug-in device 60 which were already described. The third plug-in device 62 and the fourth plug-in device 64 may, for example, be used to fix the heating unit 20 on a suitable support (not shown). The support may comprise plug-in devices which are complementary to the third plug-in device 62 and the fourth plug-in device 64 and are capable of engaging with these.

On the side of the heating layer 10 facing away from the base body 24 another heating unit (not shown) may follow. The two heating units may, for example, be connected to each other by substance bonding. The other heating unit (not shown) may also comprise a third and a fourth plug-in device 62, 64 on its side facing away from the shown heating unit 20. The pair formed in this way which comprises the heating layer 10 as well as a heat conducting body 22 disposed on both of its sides, respectively, may then be stably stacked in a stacking direction extending perpendicular to the heating layer 10 using units identical in construction.

Figure 5:
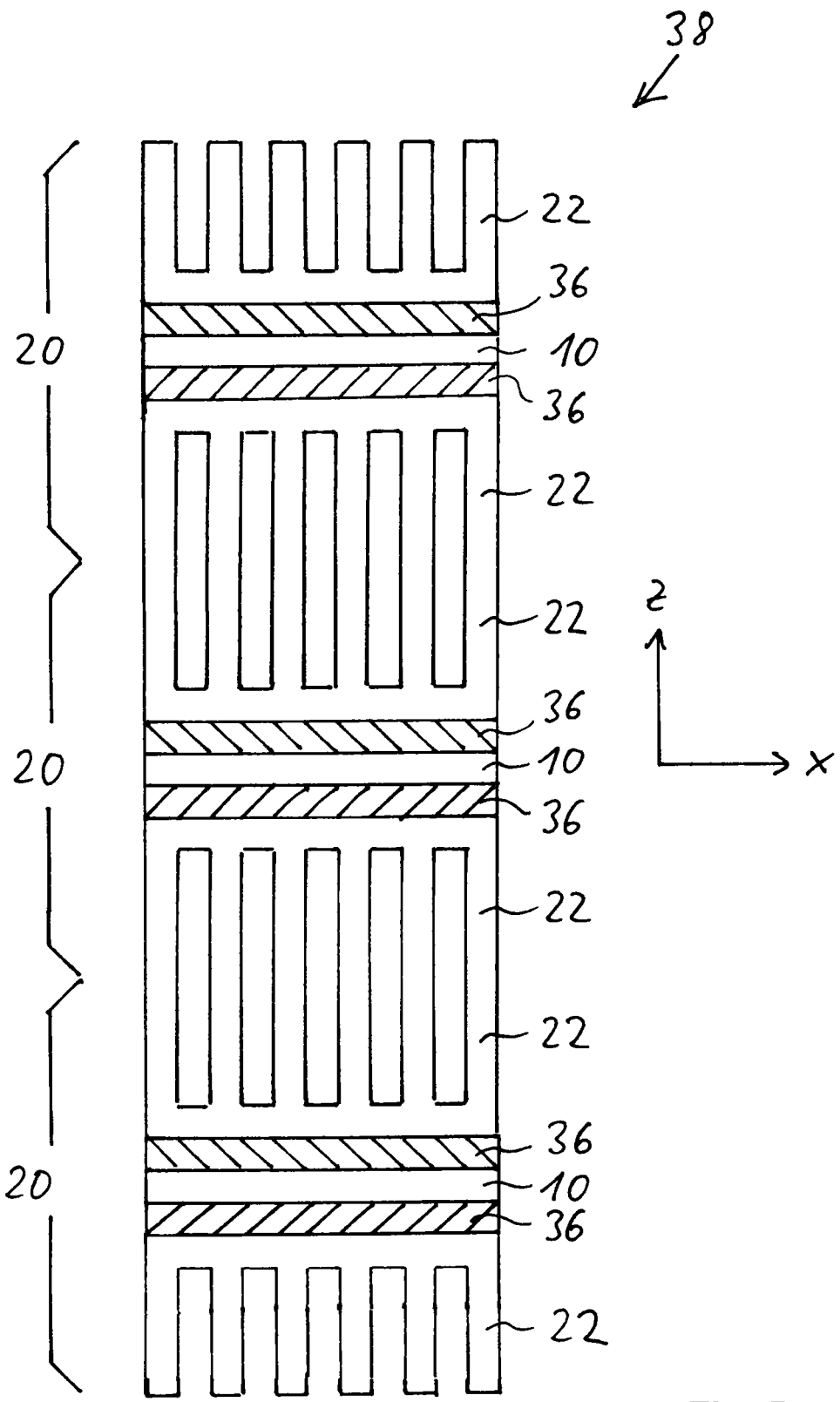
FIG. 5 shows a schematic cross sectional view of an embodiment of a stack of a plurality of electrical heating units.

FIG. 5 shows a stack 38 of a total number of three heating units 20 stacked on top of each other. Each of the heating units 20 comprises a heating layer 10 as well as a heat conducting body 22 on both sides of the heating layer 10, respectively. Between the heat conducting body 22 and the heating element 10 an insulation layer 36 is disposed, respectively. In this example, each of the three heating units 20 is mirror inverted with respect to a central plane of the heating layer 10. Due to the fact that a heat releasing body 26 of the one heat conducting body 22 is precisely faced by a heat releasing body of the heat conducting body 22 disposed on the other side of the heating layer 10, respectively, a particularly high mechanical robustness is obtained.

In the example shown each heat conducting body 22 with the exception of the uppermost heat conducting body 22 and the lowermost heat conducting body 22 is connected to a heat conducting body 22 of an adjacent heating unit 20 in the stack by substance bonding.

The two heat conducting bodies 22 connected to each other in this way may, for example, be integrally formed. Each pair of a first heat conducting body 22 and a second heat conducting body 22 comprises two main bodies which are connected to each other via heat releasing bodies.

With the stack arrangement a uniform temperature distribution is achieved as compared to a single heating unit of the same size.

Substance-to-substance bonding of a plurality of heating units may be technically difficult. As an alternative to the substance-to-substance bond the heating units may be loosely stacked on top of each other and suitably pressed on with respect to each other by a clamping device abutting at the outside. The clamping device may, for example, comprise screws or clamps for generating the required pressing force.

Figure 6:
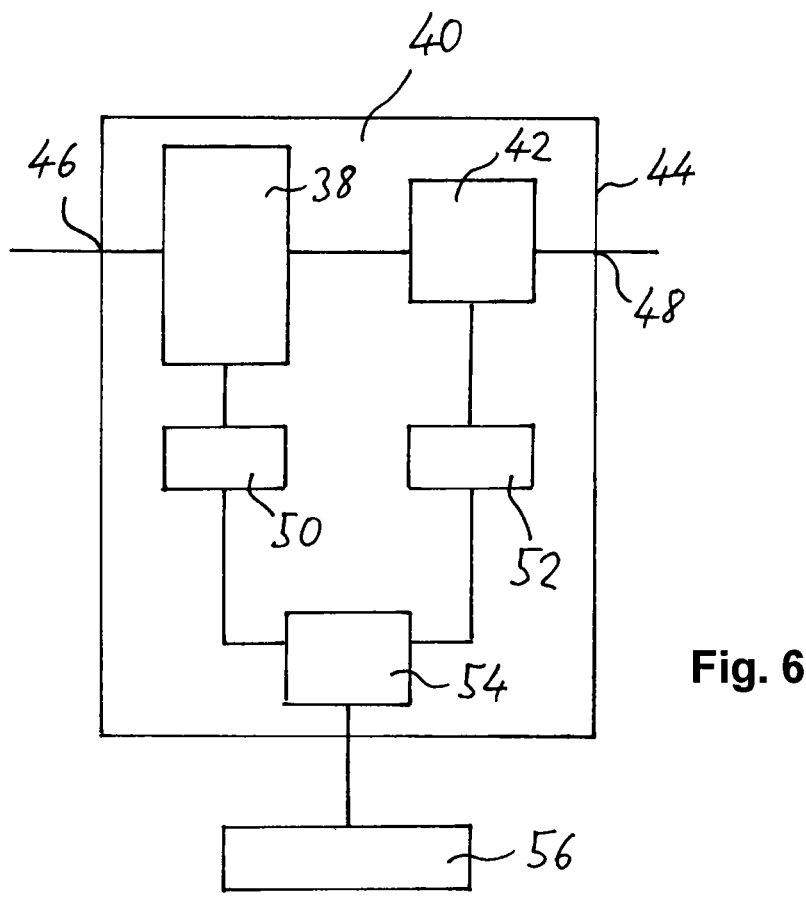
FIG. 6 shows a schematic functional diagram of an embodiment of a heating device.

FIG. 6 schematically shows an example of a heating device 40 for a vehicle. The heating device 40 contains a stack 38 of a plurality of heating units. The heating device may contain more than a single stack 38. The stack 38 may be the stack 38 described with reference to FIG. 5. The heating device 40 further comprises a fan 42, a first output control unit 50, a second output control unit 52 as well as an electronic control unit 54 auf. The electronic control unit 54 may, for example, be connected to a data bus 56 of the vehicle. The components 38, 42, 50, 52, 54 are arranged in a common housing 44. The housing 44 comprises an air inlet 46 and an air outlet 48.

In operation the fan sucks in air via the air inlet 46 and the stack 38. The sucked-in air leaves the heating device 40 via the fan 42 and the air outlet 48. When flowing through the stack 38 it is heated by it. The first output control unit 50 controls the heating output of the stack 38, for example by controlling an electric voltage applied to the stack 38 or to the individual heating resistors, respectively, or of an electric current flowing through the heating resistors. The second output control unit 52 controls the output of the fan 42 and thus the flow rate of the air to be heated. The electronic control unit 54 in turn controls the first output control unit 50 and the second output control unit 52 depending on signals it receives from the data bus 56. The heating device 40 may, for example, be arranged in a motor vehicle.

Other designs than the one shown in FIG. 6 are also possible. In particular, individual components may be disposed outside of the housing.

Figure 7:
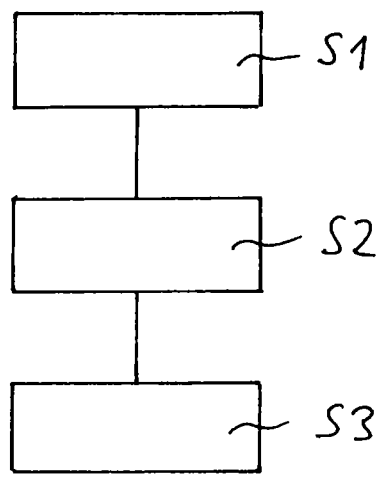
FIG. 7 shows a flow chart of an embodiment of a method for producing a heating unit.

The flow diagram in FIG. 7 illustrates an example of a method for producing a heating unit 20. The heating unit 20 may, for example, be the heating unit shown in FIG. 3. In a first step S1 a heat conducting body 22 is produced. The heat conducting body may, for example, be integrally formed of metal by casting or injection moulding. Then the insulation layer 36 is applied to the heat absorbing face 32 of the base body, for example, by means of a plasma coating method (S2). Then the heating layer 10 is applied to the insulation layer 36 (S3), for example by means of a plasma coating method or a screen printing method or as a resistor paste. The stack 38 shown in FIG. 5 can be produced step by step using the steps described with reference to FIG. 7.

With the substance-to-substance bonds between the respective contact partners described here the presence of air at undesired positions between the contact partners can be avoided. The heat transfer between the contact partners can therefore be significantly improved.

The features of the invention disclosed in the above description, in the drawings as well as in the claims may be important for the realisation of the invention both individually and in any combination.

The invention claimed is:

1. An electrical heating unit for a heating device for a vehicle comprising a heating layer and a heat conducting body, wherein the heating layer comprises at least one heating resistor, and the heat conducting body comprises a heat absorbing face for absorbing heat from the heating layer and a heat releasing face for releasing heat to a heat carrier fluid, wherein the heat conducting body comprises a base body and at least two heat releasing bodies, wherein the base body and the heat releasing bodies are connected to each other by substance bonding or are integrally formed, wherein the heat absorbing face is a surface of the base body facing the heating layer and extending parallel to the heating layer, and the heat releasing face is a surface of the heat releasing bodies.

2. The heating unit according to claim 1, wherein the base body and the heating layer are connected to each other by substance bonding.

3. The heating unit according to claim 1, wherein an electrically insulating insulation layer is provided between the heating layer and the base body.

4. The heating unit according to claim 3, wherein the insulation layer contains a ceramic material or a polymer material.

5. The heating unit according to claim 1, wherein the heating unit comprises at least one plug-in device provided to engage with a complementary plug-in device of a second heating unit having the identical in construction.

6. The heating unit according to claim 1, wherein the heating layer is free of another heat conducting body on its side facing away from the heat absorbing face, and wherein no flow area for a heat carrier fluid is provided on the side of the heating layer facing away from the heat absorbing face either.

7. The heating unit according to claim 1, wherein the heat releasing face is larger than the heat absorbing face.

8. The heating unit according to claim 1, wherein the heat releasing bodies are formed as heat ribs.

9. The heating unit according to claim 1, wherein the heat releasing bodies extend in a plane perpendicular to the heat absorbing face.

10. A heating device for a vehicle comprising a heating unit according to claim 1.

11. The heating device according to claim 10 comprising a stack of at least two heating units according to claim 1.

12. The heating device according to claim 11 comprising a clamping device pressing the at least two heating units against each other.

13. A method for producing a heating unit according to claim 3, the method comprising the steps of:
manufacturing the heat conducting body;
applying the insulation layer to the heat absorbing face; and
applying the heating layer to the insulation layer.

14. The method according to claim 13, wherein the step of applying the insulation layer to the heat absorbing face uses a plasma coating method.

15. The method according to claim 13, wherein the step of applying the heating layer to the insulation layer uses a plasma coating method, a screen printing method or a resistor paste.

16. The heating unit according to claim 7, wherein a heat conduction coefficient for a heat flow through the heat releasing face is lower than a corresponding heat conduction coefficient for a heat flow through the heat absorbing face.

17. The heating unit according to claim 11, wherein a first heating unit and a second heating unit of the at least two heating units are adjacent with respect to each other, wherein the first heating unit and the second heating unit share a common heat conducting body consisting of the heat conducting body of the first heating unit and the heat conducting body of the second heating unit, wherein the heat conducting bodies are connected to each other by substance bonding or integrally formed.

18. The heating unit according to claim 3, wherein the insulating layer has a thickness, and the thickness is less than 1 millimeter.

19. The heating unit according to claim 3, wherein the insulating layer has a thickness, and the thickness is in the range between 300 micrometers and 999 micrometers.

20. The heating unit according to claim 1, wherein the heat carrier fluid is a liquid.

21. The heating unit according to claim 1, wherein in operation of the heating unit, the heat carrier fluid flows past the heat releasing face.

22. The heating unit according to claim 1, wherein the heat conducting body is formed of metal.

* * * * *